May 27, 1952 W. MILLER ET AL 2,598,584

TURNTABLE FOR RECORD CHANGERS

Filed Sept. 28, 1944

Inventor
JAMES L. DONALDSON MORRISON
WALTER MILLER

By Fred C Geiger
Attorney

Patented May 27, 1952

2,598,584

UNITED STATES PATENT OFFICE 2,598,584

TURNTABLE FOR RECORD CHANGERS

Walter Miller and James L. Donaldson Morrison, Benton Harbor, Mich.

Application September 28, 1944, Serial No. 556,216

3 Claims. (Cl. 274—10)

The present invention relates to record changers and more particularly to an improved turntable, one that will permit records to be played on both sides without the necessity of turning the records over.

Various types of methods for changing records have in the past been employed, the simplest of which has been the stacking of records above the turntable and dropping them one at a time onto the turntable. In a machine designed to play records on one side only the played records may be left on the turntable if desired, however the pick-up of the machine can only play the top or exposed side of the record, the bottom or under side of the record will not be accessible to the pick-up.

It is a primary object of the present invention to provide in a simple drop type record changer, a turntable that will permit records to be played on both sides without the necessity of removing them from the area directly under the record magazine.

Another object of the present invention is the provision of a turntable mounted outside of the diameter of the normal playing position of records.

A still further object of the present invention is the provision of a turntable adapted to swing inwardly and outwardly of the diameter of the normal playing position of records.

With these and other objects in view, as well as other advantages which may be incident to the use of the improvements, the invention consists in the combination and arrangement of parts hereinafter set forth and claimed with the understanding that the various elements consituting the same may be varied in proportion and arrangement without departing from the spirit and scope of the invention and the claims hereto appended.

In order to make the invention more clearly understood there are shown in the accompanying drawings, means for carrying the invention into practical effect without limiting the improvements in their useful application to the particular construction and arrangement, which, for the purpose of explanation, have been made the subject of illustration.

Figure 1:
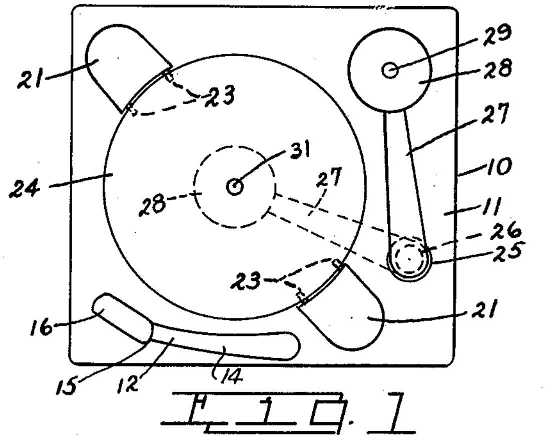
Figure 1 is a top plan view of a record changer and illustrating the turntable outside the diameter of a record and in a non-playing position in solid lines, the dotted lines indicating the playing position of the turntable.

Referring now to the drawings, the numeral 10 represents a record changer having a base 11 that has mounted thereon a tone arm 12 having an upright element 13 and an arm 14, the end of the arm at 15 having a pick-up element 16 that is provided with stylus points 17 and 18. The magazine record dropping mechanism 19 comprises elements 20 that are secured to the base 11 and they are provided with head elements 21 that are provided with pins 23, the pins supporting a plurality of record discs 24. The numeral 50 represents means in a housing for operating the arm 27, and pins 23 in Figures 1 and 2, and arm 41 in Figure 3 as described and therefore it is felt no special form of mechanism need be shown as there are various ways of operating these elements and no claim is made to mechanism for operating the elements.

The turntable comprises an upright element 25 that has mounted therein an element 26 that is adapted to move in a vertical direction as well as in an arcuate path. The element 26 carries an arm 27 having a turntable 28, the turntable being provided with a bore 29 that is in register with a bore 30 in the arm 27, the bores being provided for a purpose to be later described. No elements are shown in the drawings for holding a record that has been played while the turntable is moving to its non-playing position, as various ways may be employed, and as this feature per se forms no part of the present invention, it is deemed not necessary.

Figure 2:
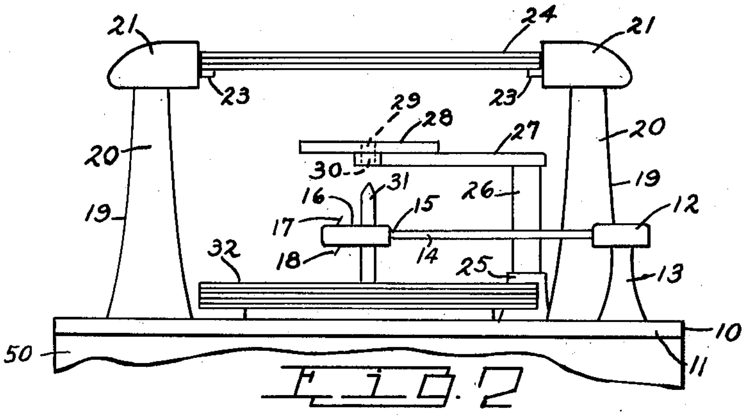
Figure 2 is an elevational view of the record changer and illustrating the turntable out of playing position.

A spindle 31 is carried by the base 11 and it is positioned centrally of the discs 24 that are positioned on the magazine or record dropping elements 23, and as shown in Figure 2 the discs 32 on the spindle 31 represent records that have been played.

Figure 3:
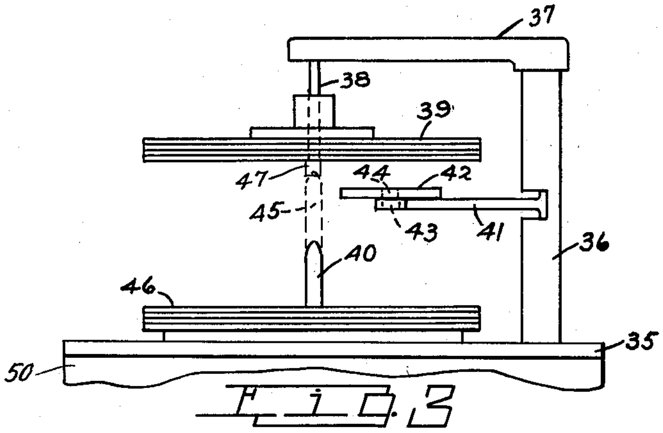
Figure 3 is a modified form of the present invention and showing the turntable pivotally mounted to an upright, the spindle arranged to allow the turntable to swing in and out of engagement with the spindle.

In Figure 3 of the drawings, we have shown a modification of the present invention, the tone arm and pins as shown in Figure 1 having been omitted. In the modification the numeral 35 represents the base to which is secured an upright element 36 having an arm 37. The arm 37 is provided with a depending element 38 that holds a stack of records or discs 39, and directly below the element 38 is a spindle 40 that is adapted to move in a vertical direction up and down. To the upright element 36 there is pivotally mounted for movement in an arcuate path an arm 41 having a turntable 42. The arm 41 and the turntable are provided with uniform bores 43 and 44 respectively and of a diameter slightly larger than the diameter of the spindle 40 thus permitting the spindle 40 when the turntable 42 is in playing position to pass through the bores and serve as a means for holding the turntable 42 in playing position as well as the record on the turntable. The dotted line 45 indicates the spindle 40 in playing position, and the numeral 46 a stack of played records, 47 the end of the depending element 38.

In the operation of the record changer, the turntable 28 is swung to the center of the records that are held by the record dropping pins 23 as shown by the dotted lines in Figure 1 of the drawing and in full lines in Figure 2, and in this position the turntable receives a record and it is then lowered to a position where the spindle 31 engages the bore 29, rotation of the spindle causing rotation of the turntable. In the lowered position of the turntable, the arm 12 may be positioned that stylus 17 engages the undersurface of a record, or stylus 18 engages the top face of a record or disc.

In the operation of the modified form of the record changer, the turntable 42 is swung into axial alignment with the spindle 40 which moves up through the bores 43 and 44 and continues on up until it touches the end 47 of the depending element 38 after which the bottommost record in the stack 39 is deposited on the turntable. The (tone arm) not shown, which is identical with the tone arm 14 is then brought into engagement with the record and when both sides have been played, the spindle is lowered, the record may be returned to the bottom of the stack 39 on spindle 38 and then released and deposited on the records on the spindle 40 after the turntable has in the meantime been swung to a position outside of the diameter of the records to a non-playing position.

What we claim is:

1. In a phonograph record changer, an element comprising an upstanding spindle, a second element comprising an arm supporting a rotatable turntable at one end of said arm, said arm and turntable having a vertical opening therethrough, the upper surface of the turntable being free to receive a record thereon, means mounting one of said elements for horizontal movement to and from an operative position wherein said spindle and opening are aligned, and means mounting one of said elements for vertical movement to extend the spindle through said opening.

2. The structure defined in claim 1 wherein the one said element is an arm and turntable.

3. The structure defined in claim 1 wherein the said one element is a spindle.

WALTER MILLER.
JAMES L. DONALDSON MORRISON.

REFERENCES CITED

The following references are of record in the file of this patent:

UNITED STATES PATENTS

| Number | Name | Date |
|---|---|---|
| 1,954,246 | Jones | Apr. 10, 1934 |
| 2,062,396 | Carson | Dec. 1, 1936 |
| 2,068,449 | Downs | Jan. 19, 1937 |
| 2,090,746 | Compare | Aug. 24, 1937 |
| 2,159,836 | Alm | May 23, 1939 |
| 2,274,921 | Filben | Mar. 3, 1942 |
| 2,318,654 | Wissner | May 11, 1943 |
| 2,457,668 | Hart | Dec. 28, 1948 |

FOREIGN PATENTS

| Number | Country | Date |
|---|---|---|
| 541,156 | Great Britain | Nov. 14, 1941 |